United States Patent
Koga

(10) Patent No.: US 10,630,942 B2
(45) Date of Patent: Apr. 21, 2020

(54) CONTROL METHOD AND INFORMATION PROCESSING DEVICE

(71) Applicant: FUJITSU LIMITED, Kawasaki-shi, Kanagawa (JP)

(72) Inventor: Susumu Koga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 383 days.

(21) Appl. No.: 15/471,460

(22) Filed: Mar. 28, 2017

(65) Prior Publication Data

US 2017/0332053 A1 Nov. 16, 2017

(30) Foreign Application Priority Data

May 11, 2016 (JP) ................................ 2016-095579

(51) Int. Cl.
*H04N 7/18* (2006.01)
*H04W 4/38* (2018.01)
(Continued)

(52) U.S. Cl.
CPC ............. *H04N 7/183* (2013.01); *G06F 3/011* (2013.01); *G06F 3/012* (2013.01); *G06T 19/006* (2013.01); *H04N 5/23206* (2013.01); *H04N 5/23212* (2013.01); *H04N 5/23232* (2013.01); *H04N 5/232939* (2018.08); *H04N 5/44* (2013.01); *H04N 7/188* (2013.01); *H04W 4/38* (2018.02); *H04L 67/12* (2013.01); *H04N 5/4401* (2013.01);
(Continued)

(58) Field of Classification Search
CPC ...... H04N 7/183; H04N 7/188; H04N 7/0127; H04N 5/23212; H04N 5/44; H04N 5/23206; H04N 5/23232; H04N 5/232939; H04N 5/4401; Y02D 70/1262; Y02D 70/164; Y02D 70/142; Y02D 70/00; Y02D 70/14; Y02D 70/126; Y02D 70/10; Y02D 70/12; H04W 4/38; H04L 67/12; G06F 3/012; G06F 3/011; G06T 19/006

See application file for complete search history.

(56) References Cited

U.S. PATENT DOCUMENTS

| | | | | |
|---|---|---|---|---|
| 8,266,665 | B2 * | 9/2012 | Beyabani | H04N 17/004 725/109 |
| 2006/0215555 | A1 * | 9/2006 | Futenma | H04N 21/2662 370/230 |
| 2015/0138224 | A1 * | 5/2015 | Kim | G02B 27/0172 345/592 |

FOREIGN PATENT DOCUMENTS

| | | |
|---|---|---|
| JP | 2005-242830 | 9/2005 |
| JP | 2010-171634 | 8/2010 |

(Continued)

OTHER PUBLICATIONS

Japanese Office Action dated Jan. 7, 2020, issued in corresponding Japanese Patent Application No. 2016-09559.

*Primary Examiner* — Oschta I Montoya
(74) *Attorney, Agent, or Firm* — Xsensus LLP

(57) ABSTRACT

A method includes acquiring sensor information on movement of a first computer that includes a sensor, the sensor information being sensed by the sensor, determining whether or not the first computer is traveling according to the sensor information, deciding a frequency with which a plurality of images taken by a camera that travels with the first computer are transmitted to a second computer according to a result of determination of whether or not the first computer is traveling, and sequentially transmitting the plurality of images to the second computer according to the frequency.

15 Claims, 9 Drawing Sheets

(51) Int. Cl.
  *G06F 3/01*     (2006.01)
  *H04N 5/232*    (2006.01)
  *G06T 19/00*    (2011.01)
  *H04N 5/44*     (2011.01)
  H04L 29/08      (2006.01)
  H04N 7/01       (2006.01)

(52) U.S. Cl.
  CPC ............ *H04N 7/0127* (2013.01); *Y02D 70/00* (2018.01); *Y02D 70/10* (2018.01); *Y02D 70/12* (2018.01); *Y02D 70/126* (2018.01); *Y02D 70/1262* (2018.01); *Y02D 70/14* (2018.01); *Y02D 70/142* (2018.01); *Y02D 70/164* (2018.01)

(56) References Cited

FOREIGN PATENT DOCUMENTS

JP      2015-179947       10/2015
WO      2014/147917 A1    9/2014

\* cited by examiner

CONTROL METHOD AND INFORMATION PROCESSING DEVICE

CROSS-REFERENCE TO RELATED APPLICATION

This application is based upon and claims the benefit of priority of the prior Japanese Patent Application No. 2016-095579, filed on May 11, 2016, the entire contents of which are incorporated herein by reference.

FIELD

The embodiments discussed herein are related to techniques to control transmission of images.

BACKGROUND

An image transmission control system that transmits images taken by a camera arranged in a terminal device carried by a worker who is engaged in inspection operations or the like, or a surveillance camera placed in a facility to an information processing device is proposed. For example, in an image transmission control system to which a terminal device and an information processing device are applied, mutual communication via a server enables not only one-to-one coupling between the terminal device and the information processing device but also enables one-to-many, many-to-one, or many-to-many coupling. For example, such a system is utilized for remote support to support the inspection operations of a worker based on a taken image transmitted to an information processing device.

In recent years, augmented reality (AR) techniques by which an object is superimposed and displayed on a taken image using a display device, such as a head mount display, have been proposed. Remote support systems to which such AR techniques are applied have been proposed.

Related techniques are disclosed in for example, Japanese Laid-open Patent Publication No. 2005-242830, Japanese Laid-open Patent Publication No. 2010-171634, and Japanese Laid-open Patent Publication No. 2015-179947.

SUMMARY

According to an aspect of the invention, a method includes acquiring sensor information on movement of a first computer that includes a sensor, the sensor information being sensed by the sensor, determining whether or not the first computer is traveling according to the sensor information, deciding a frequency with which a plurality of images taken by a camera that travels with the first computer are transmitted to a second computer according to a result of determination of whether or not the first computer is traveling, and sequentially transmitting the plurality of images to the second computer according to the frequency.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

According to conventional techniques, power consumed in image transmission increases with the addition of terminal devices or information processing devices communicated with a server.

In an aspect, the techniques disclosed in embodiments are aimed at inhibiting power consumption.

The embodiments of an image transmission control program, an image transmission control method, and an image transmission control device of the present disclosure are described in detail below based on the drawings. The present embodiments are not intended to limit the disclosed techniques. The embodiments described below may be combined as desired within the scope where no contradiction is caused.

Embodiments

Figure 1:
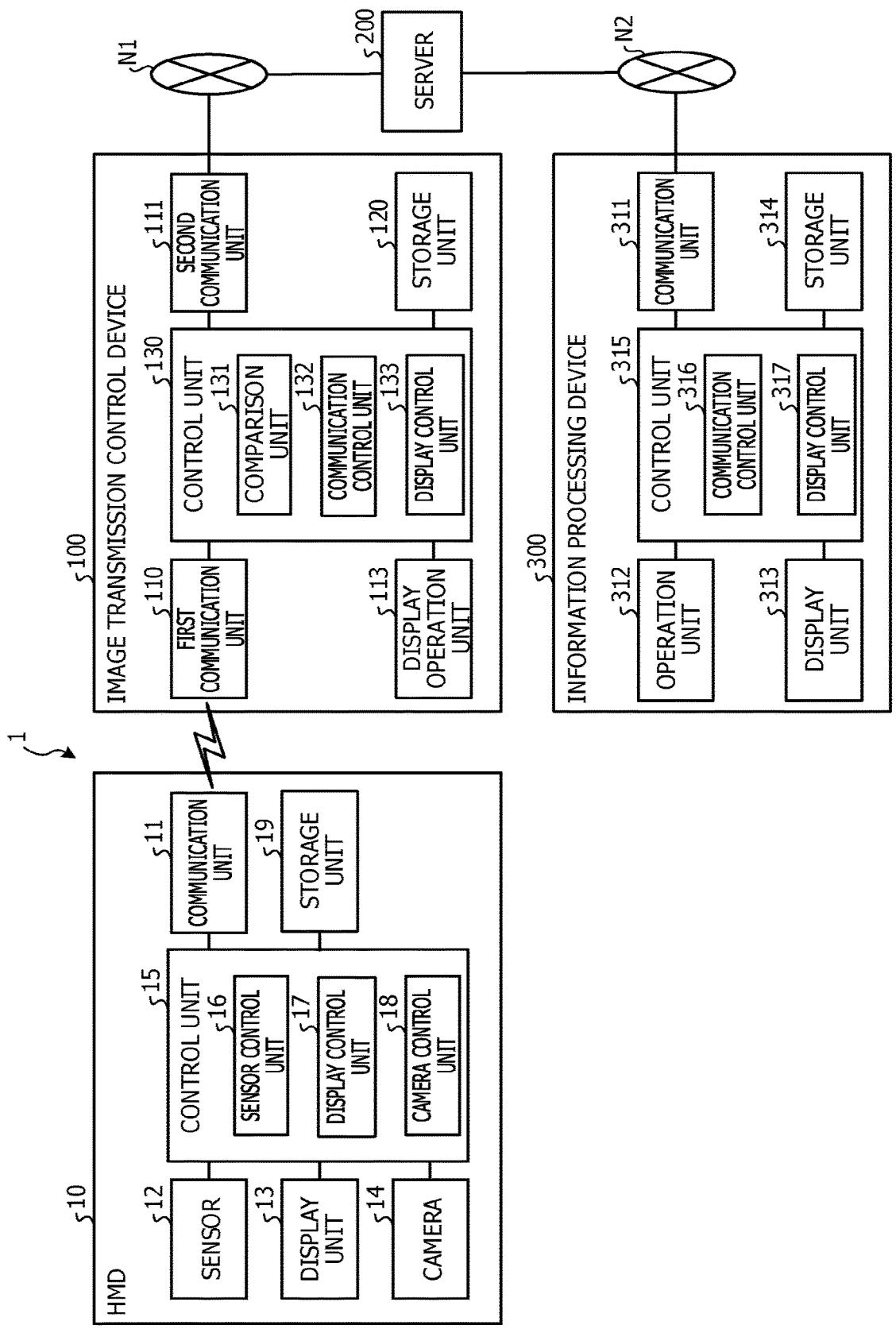
FIG. 1 is a block diagram that illustrates an example of a configuration of an image transmission control system according to an embodiment.

FIG. 1 is a block diagram that illustrates an example of a configuration of an image transmission control system 1 according to an embodiment. The image transmission control system 1 illustrated in FIG. 1 includes a head mount display, which is hereinafter also referred to as an HMD, 10, an image transmission control device 100, a server 200, and an information processing device 300. The HMD 10 and the image transmission control device 100 are communicated with each other one-to-one wirelessly or in a wired manner. That is, the HMD 10 functions as an example of a display unit of the image transmission control device 100. The coupling between the HMD 10 and the image transmission control device 100 is not limited to one-to-one coupling but may be one-to-many, many-to-one, or many-to-many coupling. Although FIG. 1 illustrates a single pair of the HMD 10 and the image transmission control device 100 as an example, the number of pairs of the HMDs 10 and the image transmission control devices 100 is not limited but the number of pairs of the HMDs 10 and the image transmission control devices 100 that are included may be a desired number. The HMD 10 and the image transmission control device 100 are examples of a terminal device. In the description below, the image transmission control device 100 may include the HMD 10 as the terminal device, and the image transmission control device 100 including the HMD 10 may be simply expressed as the image transmission control device 100.

For example, the HMD 10 and the image transmission control device 100 are coupled via a wireless local area network (LAN), such as Wi-Fi Direct (registered trademark), so as to be able to communicate mutually. The image transmission control device 100 and the server 200 are coupled via a network N1 so as to be able to communicate mutually. The server 200 and the information processing device 300 are coupled via a network N2 so as to be able to communicate mutually. As the networks N1 and N2, a desired kind of a communication network, such as the Internet, a LAN, or a virtual private network (VPN), may be employed regardless of whether the network is wired or wireless.

The HMD 10 is worn by a user together with the image transmission control device 100 and displays a display screen transmitted from the image transmission control device 100. The HMD 10 may use for example, a monocular transmissive HMD. The HMD 10 may use for example, various HMDs, which include a binocular HMD and an immersive HMD.

The HMD 10 includes a sensor that senses movement of the HMD 10. The HMD 10 transmits information on the movement of the HMD 10 sensed by the sensor to the image transmission control device 100.

The image transmission control device 100 is a terminal device that is worn and operated by a user, and may use for example, a mobile communication terminal, such as a tablet terminal or a smartphone. The image transmission control device 100 determines whether or not the user who wears the HMD 10 is traveling according to the information sensed by the sensor, and performs control to inhibit or promote the transmission of an image according to the determination result.

Since when the user is traveling, for example, the user is performing no operations and the necessity for remote support is low, it is assumed that the frequency of the image transmission from the image transmission control device 100 to the information processing device 300 may be inhibited. In the present embodiment, the power consumption of the image transmission control device 100 is inhibited in view of this respect. Accordingly, the image transmission control device 100 may inhibit the power consumption.

In contrast, since when the user is not traveling, for example, the user is performing operations and the necessity for remote support is high, it is assumed that the image transmission from the image transmission control device 100 to the information processing device 300 is desirably promoted. In the present embodiment, the power consumption of the image transmission control device 100 is inhibited in view of this respect. That is, the image transmission control device 100 may inhibit the power consumption when it is undesired to promote the transmission of an image.

The sensor may use a sensor included in the image transmission control device 100 to determine whether or not the user is traveling instead of using the sensor of the HMD 10.

For example, the HMD 10 further includes a camera that corresponds to an eye point of the user wearing the HMD 10 and acquires a taken image. The HMD 10 transmits the taken image taken by the camera to the image transmission control device 100.

The image transmission control device 100 receives the taken image taken by the camera of the HMD 10 from the HMD 10. The image transmission control device 100 determines whether or not the taken image received from the HMD 10 includes, for example, an identifier for equipment inspection in a factory, and performs control to inhibit the transmission of an image according to the determination result. Examples of the identifier for equipment inspection include an AR marker arranged at a predetermined position in a factory.

Since when the taken image includes no identifier, for example, the user is not present in a facility where remote support is desired and the necessity for remote support is low, it is assumed that the frequency of the image transmission from the image transmission control device 100 to the information processing device 300 may be inhibited. In the present embodiment, the power consumption of the image transmission control device 100 is inhibited in view of this respect. Accordingly, the image transmission control device 100 may inhibit the power consumption.

Since when the taken image includes an identifier, for example, the user is present in a facility where remote support is desired and the necessity for remote support is high, it is assumed that the frequency of the image transmission from the image transmission control device 100 to the information processing device 300 is desirably boosted. In the present embodiment, the power consumption of the image transmission control device 100 is inhibited in view of this respect. That is, the image transmission control device 100 may inhibit the power consumption when it is undesired to promote the transmission of an image.

The camera may use a camera included in the image transmission control device 100 to determine whether or not the taken image includes an identifier instead of using the camera of the HMD 10.

The server 200 transmits the image received from the image transmission control device 100 to the information processing device 300. Further, the server 200 outputs various kinds of information, instructions, or the like received from the information processing device 300 to the image transmission control device 100. Also, the server 200 includes, for example, a database where AR contents for equipment inspection in a factory are managed as object data. The server 200 transmits the object data to the image transmission control device 100 via the network N1 when desired from the image transmission control device 100.

A configuration of the HMD 10 is described below. As illustrated in FIG. 1, the HMD 10 includes a communication unit 11, a sensor 12, a display unit 13, a camera 14, a control unit 15, and a storage unit 19. In addition to the functional units illustrated in FIG. 1, the HMD 10 may include a functional unit, which is for example an input device or a voice output device of various kinds.

The communication unit 11 is implemented with for example, a communication module, such as a wireless LAN. The communication unit 11 is for example, a communication interface that is communicated with the image transmission control device 100 wirelessly via Wi-Fi Direct (registered trademark) and governs the information communication with the image transmission control device 100. The communication unit 11 receives a display screen from the image transmission control device 100. The communication unit 11 outputs the received display screen to the control unit 15. Further, the communication unit 11 transmits the sensor information and the taken image, which are input from the control unit 15, to the image transmission control device 100.

The sensor 12 senses movement of the HMD 10, that is, movement of the user who wears the HMD 10. The sensor 12 is for example, an acceleration sensor, a gyro sensor, or another direction sensor, which senses the direction of the HMD 10, and senses the orientation of the HMD 10, that is, the direction in which the user is oriented. As the acceleration sensor, for example, a three-axis acceleration sensor of piezoresistance, capacitance, or the like may be used. As the gyro sensor, for example, a vibration gyro sensor may be used. The sensor 12 may be for example, an azimuth sensor or may be for example, a Global Positioning System (GPS) receiver or another position sensor, which senses the position of the HMD 10. Further, the sensor 12 may be used by for example, combining two or more of the above-described direction sensors and position sensors. The sensor 12 outputs information including the sensed direction and/or position to the control unit 15.

The display unit 13 is a display device for displaying various kinds of information, such as object data. For example, the display unit 13 corresponds to a display element of a transmissive HMD, where an image including an AR content as the object data is projected onto a half mirror and the user may see outside scenery together with the AR content. The display unit 13 may be a display element that corresponds to an HMD of immersion, video transmissive, retina projection, or the like.

The camera 14 is an image pickup device that includes an image pickup element, such as a charge-coupled device (CCD) or a complementary metal oxide semiconductor (CMOS). For example, the camera 14 includes a plurality of photoreceptors, which are red (R), green (G), and blue (B) for example. The camera 14 is worn or included in the HMD 10 so that a view equivalent to the view that the user may obtain through the display unit 13 of the HMD 10 may be ensured.

Figure 2:
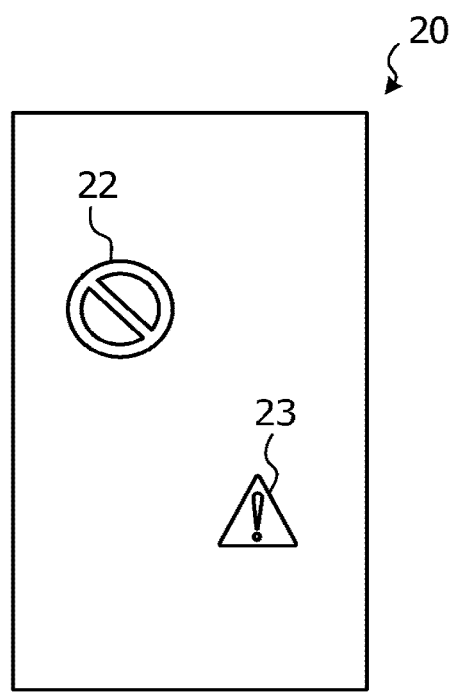
FIG. 2 illustrates an example of display of object data.

An example of a display screen displayed on the HMD 10 is described below. FIG. 2 illustrates an example of display of object data. Described here is a case where AR contents are used as examples of the object data. As illustrated in FIG. 2, an image including AR contents 22 and 23, which constitute the object data, is displayed on a display screen 20 of the HMD 10. Accordingly, the user who wears the HMD 10 may see for example, equipment in a factory that undergoes inspection operations and the AR contents 22 and 23 through superimposition. FIG. 2 illustrates an example of the display screen 20 vertically oriented, where the length in the vertical direction, that is, the longitudinal direction is longer than the length in the horizontal direction, that is, the lateral direction. However, for example, the display screen 20 may be set as desired according to the shape or the like of the display unit 13 and may be for example, a display screen that is horizontally oriented.

The control unit 15 is implemented by for example, a central processing unit (CPU), a micro processing unit (MPU), or the like executing a program stored in an internal storage device while random access memory (RAM) serves as a workspace. The control unit 15 may be implemented by for example, an integrated circuit, such as an application specific integrated circuit (ASIC) or a field programmable gate array (FPGA). The control unit 15 includes a sensor control unit 16, a display control unit 17, and a camera control unit 18, and implements or executes a function or an action of information processing, which is described below. An internal configuration of the control unit 15 is not limited to the configuration illustrated in FIG. 1, and may be another configuration as long as the configuration allows the information processing described below.

The storage unit 19 is implemented with a storage device, which is for example, a semiconductor memory element, such as RAM or flash memory. The storage unit 19 stores information used in a process in the control unit 15.

The sensor control unit 16 outputs control information to the sensor 12 so as to instruct the sensor 12 to output information on the movement of the HMD 10, such as one or more pieces of information included in direction information and positional information of the HMD 10. The sensor control unit 16 receives one or more pieces of information on the movement of the HMD 10 from one or more sensors that constitute the sensor 12. The sensor control unit 16 treats the received one or more pieces of information on the movement of the HMD 10 as sensor information and transmits the sensor information to the image transmission control device 100 via the communication unit 11. The sensor control unit 16 transmits the sensor information including one or more pieces of information on the movement of the HMD 10 every second for example.

The display control unit 17 causes the display unit 13 to display the display screen received from the image transmission control device 100 via the communication unit 11. The display control unit 17 updates the display of the display unit 13 according to an update of the display screen.

The camera control unit 18 outputs control information to the camera 14 so as to instruct the camera 14 to output a taken image. The camera control unit 18 acquires the taken image taken by the camera 14. The camera control unit 18 transmits the taken image acquired from the camera 14 to the image transmission control device 100 via the communication unit 11. The camera control unit 18 transmits the taken image acquired from the camera 14 at 10 frames per second (fps) for example.

A configuration of the image transmission control device 100 is described below. As illustrated in FIG. 1, the image transmission control device 100 includes a first communication unit 110, a second communication unit 111, a display operation unit 113, a storage unit 120, and a control unit 130. In addition to the functional units illustrated in FIG. 1, the image transmission control device 100 may include various functional units included in a known computer, which are for example functional units, such as an input device or a voice output device of various kinds.

The first communication unit 110 is implemented with for example, a communication module, such as a wireless LAN. For example, the first communication unit 110 is communicated with the HMD 10 wirelessly by Wi-Fi Direct (registered trademark) and is a communication interface that governs the information communication with the HMD 10. The first communication unit 110 receives sensor information from the HMD 10. The first communication unit 110 outputs the received sensor information to the control unit 130. The first communication unit 110 receives a taken image from the HMD 10. The first communication unit 110 outputs the received taken image to the control unit 130. The first communication unit 110 transmits the sensor control information and the display screen, which are output from the control unit 130, to the HMD 10.

The second communication unit 111 is implemented with for example, a mobile phone network, such as a third-generation mobile communication system or long term evolution (LTE), or a communication module, such as a wireless LAN. The second communication unit 111 is communicated with the server 200 wirelessly via the network N1 and is a communication interface that governs information communication with the server 200. The second communication unit 111 sequentially transmits a display screen, which is output from the control unit 130, to the server 200 via the network N1. The second communication unit 111 transmits a data acquisition instruction, which is output from the control unit 130, to the server 200 via the network N1. The second communication unit 111 receives various data according to the data acquisition instruction from the server 200 via the network N1. The second communication unit 111 outputs the various data received from the server 200 to the control unit 130.

The display operation unit 113 is a display device for displaying various kinds of information and is an input device that accepts various operations from a user. For example, the display operation unit 113 is implemented with a liquid crystal display or the like as the display device. Further, for example, the display operation unit 113 is implemented with a touch panel or the like as the input device. That is, in the display operation unit 113, the display device and the input device are integrated. The display operation unit 113 outputs an operation input by a user to the control unit 130 as operation information. The display operation unit 113 may display a screen similar to that of the HMD 10 or may display a screen different from that of the HMD 10.

Figure 3:
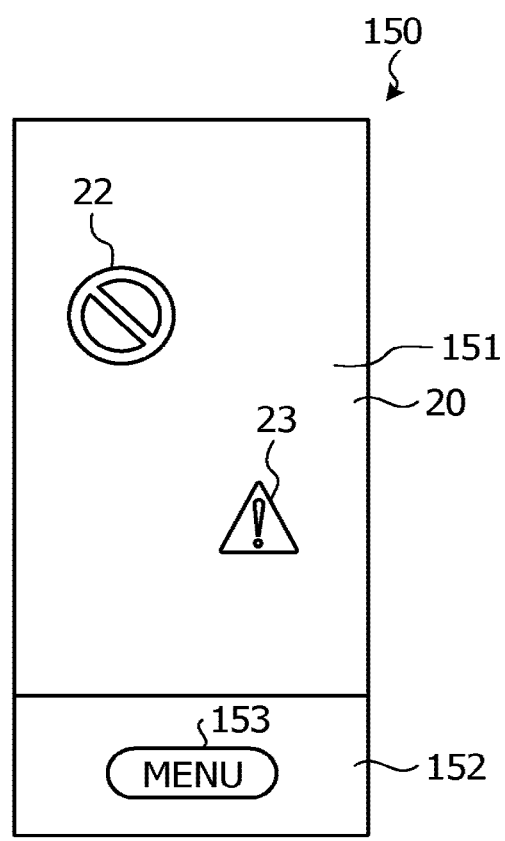
FIG. 3 illustrates an example of a display screen.

An example of a display screen displayed by the display operation unit 113 is described below. FIG. 3 illustrates an example of a display screen. Described here is a case as an example, where the display screen 20 illustrated in FIG. 2 is displayed on the HMD 10. As illustrated in FIG. 3, the display screen 150 includes an image display unit 151 and an operation unit 152 arranged under the image display unit 151. The image display unit 151 displays the display screen 20 of the HMD 10, which includes the AR contents 22 and 23, through superimposition together with a taken image taken by the camera, and an image that agrees with or resembles an image perceived by the user who wears the HMD 10 is displayed.

The operation unit 152 includes one or more graphical user interface (GUI) images, which accept various input operations when a user performs a direct touch operation with a finger or a pen. The display screen 150 illustrated in FIG. 3 includes a menu button 153 to switch the display of the image display unit 151 to a menu screen on acceptance of a touch operation in a displayed area.

FIG. 1 is described below again. For example, the storage unit 120 is implemented with a semiconductor memory element, such as RAM or flash memory, or a storage device, such as a hard disk or an optical disc. The storage unit 120 stores information used in processing in the control unit 130.

The control unit 130 is for example, implemented by a CPU, an MPU, or the like executing a program stored in an internal storage device while RAM serves as a workspace. The control unit 130 may be for example, implemented with an integrated circuit, such as an ASIC or an FPGA. The control unit 130 includes a comparison unit 131, a communication control unit 132, and a display control unit 133, and implements or executes a function or an action of information processing, which is described below. An internal configuration of the control unit 130 is not limited to the configuration illustrated in FIG. 1, and may be another configuration as long as the configuration allows the information processing described below.

The comparison unit 131 determines whether or not the HMD 10 that a user is carrying is traveling according to the sensor information received by the first communication unit 110. Specifically, for example, when the travel distance of the HMD 10 per unit time is not zero, the comparison unit 131 determines that the HMD 10 is traveling. For example, when the travel distance of the HMD 10 per unit time is zero, the comparison unit 131 determines that the HMD 10 is not traveling. The determination of whether or not the HMD 10 is traveling may be based on a result of comparing the travel distance of the HMD 10 per unit time with a preset reference value. In this case, when the travel distance of the HMD 10 per unit time exceeds the reference value, the comparison unit 131 determines that the HMD 10 is traveling and when the travel distance of the HMD 10 per unit time is equal to or less than the reference value, the comparison unit 131 determines that the HMD 10 is not traveling. The comparison unit 131 outputs the result of the determination of whether or not the HMD 10 is traveling to the communication control unit 132.

The comparison unit 131 determines whether or not the image transmission control device 100 carried by a user is working according to the information received by the first communication unit 110. Specifically, for example, based on whether or not a taken image of the HMD 10 received by the first communication unit 110 includes an AR content or another identifier, the comparison unit 131 determines whether or not the image transmission control device 100 of the user is working. That is, when an identifier is recognized as being included in a taken image of the HMD 10, the comparison unit 131 determines that the image transmission control device 100 is working. When no identifier is recognized as being included in a taken image of the HMD 10, the comparison unit 131 determines that the image transmission control device 100 not working. The comparison unit 131 may determine whether or not the image transmission control device 100 is working based on whether or not object data caused to correspond to an identifier is displayed on the display screen of the HMD 10.

A method of determining whether or not the image transmission control device 100 is working is not limited to what is described above. For example, the comparison unit 131 may determine whether or not the image transmission control device 100 is working according to the result of the determination of whether or not the image transmission control device 100 is being operated. For example, when a user's touch operation or an input operation of a parameter onto an operation screen of the display operation unit 113 is recognized, the comparison unit 131 determines that the image transmission control device 100 is working. When neither a touch operation nor an input operation of a parameter is recognized, the comparison unit 131 determines that the image transmission control device 100 is not working. The comparison unit 131 may determine whether or not the image transmission control device 100 is working based on whether or not an image highly related to an operation of a user is displayed on the display screen of the image transmission control device 100.

Figure 4:
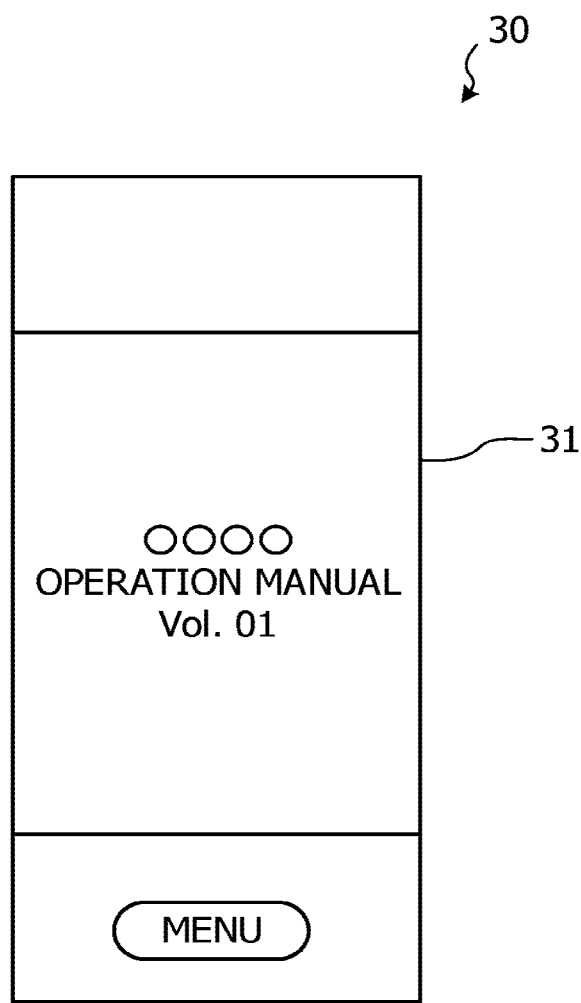
FIG. 4 illustrates another example of the display screen.

Another example of the display screen displayed by the display operation unit 113 is described below. FIG. 4 illustrates the other example of the display screen. As illustrated in FIG. 4, an operation manual 31 for inspection of certain equipment is displayed on a display screen 30. Thus, when an image highly related to an operation of a user is displayed on the display screen of the image transmission control device 100, the comparison unit 131 determines that the image transmission control device 100 is working.

The comparison unit 131 may determine whether or not a user is operating based on whether or not the second communication unit 111 has received control information on the information processing device 300 remotely supporting the image transmission control device 100. That is, when the second communication unit 111 receives the control information indicating that remote support is being performed, the comparison unit 131 determines that the image transmission control device 100 is working and when no reception of the control information is recognized, the comparison unit 131 determines that the image transmission control device 100 is not working.

When the image transmission control device 100 includes a voice recognition function, which is not illustrated, the comparison unit 131 may determine whether or not the user is operating based on whether or not the voice recognition function is utilized. That is, when the first communication unit 110 recognizes the reception of voice data input from the HMD 10, the comparison unit 131 determines that the image transmission control device 100 is working and when the first communication unit 110 recognizes no reception of voice data, the comparison unit 131 determines that the image transmission control device 100 is not working.

After that, the comparison unit 131 outputs the result of the determination of whether or not the user is operating to the communication control unit 132.

FIG. 1 is described below again. The communication control unit 132 outputs control information to the second communication unit 111 so as to instruct the second communication unit 111 to be communicated with the information processing device 300 via the server 200. That is, the communication control unit 132 establishes the coupling with the information processing device 300 via the server 200. The communication control unit 132 outputs control information to the second communication unit 111 so as to instruct the second communication unit 111 to transmit a display screen.

The communication control unit 132 outputs control information to the second communication unit 111 so as to instruct the second communication unit 111 to set and change the transmission frequency of a display screen according to the determination result output from the comparison unit 131. That is, when the HMD 10 is traveling, the communication control unit 132 performs control so that the transmission of an image to the server 200 is inhibited, compared to a case where the HMD 10 is not traveling. When the image transmission control device 100 is not working, the communication control unit 132 performs control so that the transmission of an image to the server 200 is inhibited, compared to a case where the image transmission control device 100 is working.

The control of the communication control unit 132 inhibiting the transmission of an image is described below. The communication control unit 132 causes an upper limit of the frequency of the transmission of an image from the image transmission control device 100 to the server 200 in the second communication unit 111 to be 10 fps for example. When the HMD 10 is not traveling or when the image transmission control device 100 is working, the communication control unit 132 controls the frequency of the transmission of an image from the second communication unit 111 to the server 200 so that the transmission frequency is 10 fps, which is the upper limit, for example. When the HMD 10 is traveling or when the image transmission control device 100 is not working, the communication control unit 132 inhibits the transmission of an image from the second communication unit 111 to the server 200 and controls the transmission frequency so that the transmission frequency is 5 to 7 fps for example. Accordingly, the power consumption of the image transmission control device 100 that is caused in the image transmission may be inhibited.

The display control unit 133 launches an application that uses AR middleware. When the application is launched, the display control unit 133 starts the transmission of a display screen of the application to the HMD 10 via the first communication unit 110.

When the application is launched, the display control unit 133 transmits a data acquisition instruction to the server 200 via the second communication unit 111 and the network N1. On receiving object data corresponding to the data acquisition instruction from the server 200 via the second communication unit 111 and the network N1, the display control unit 133 causes the received object data to be stored in the storage unit 120.

When the comparison unit 131 determines that a taken image of the HMD 10 includes an identifier, the display control unit 133 outputs a display screen that includes the object data caused to correspond to the identifier to the first communication unit 110. The display control unit 133 further outputs a display screen that includes the object data caused to correspond to the identifier to the display operation unit 113 after superimposing the display screen on the taken image of the HMD 10 received in the first communication unit 110.

A configuration of the information processing device 300 is described below. As illustrated in FIG. 1, the information processing device 300 includes a communication unit 311, an operation unit 312, a display unit 313, a storage unit 314, and a control unit 315. In addition to the functional units illustrated in FIG. 1, the information processing device 300 may include various functional units included in a known computer, which are for example functional units, such as an input device or a voice output device of various kinds.

The communication unit 311 is communicated with the server 200 via the network N2. The communication unit 311 is implemented with for example, a communication module or the like, such as a network interface card (NIC) or a wireless LAN. The communication unit 311 is communicated with the server 200 via the network N2 in a wired manner or wirelessly and is a communication interface that governs information communication with the server 200. The communication unit 311 receives a display screen of the image transmission control device 100 from the server 200. The communication unit 311 outputs the received display screen to the control unit 315. The communication unit 311 transmits various data corresponding to a data transmission instruction from the control unit 315 to the server 200 via the network N2. The communication unit 311 outputs various data received from the server 200 to the control unit 315.

The operation unit 312 accepts an input operation of a user of the information processing device 300. The operation unit 312 outputs the accepted input operation to the control unit 315 as operation information.

The display unit 313 is a display device for displaying various kinds of information. The display unit 313 is implemented with for example, a liquid crystal display or the like as the display device. The display unit 313 displays various screens, which include a display screen input from the control unit 315.

The storage unit 314 is implemented with for example, a semiconductor memory element, such as RAM or flash memory, or a storage device, such as a hard disk or an optical disc. The storage unit 314 stores information used in a process in the control unit 315.

The control unit 315 is for example, implemented by a CPU, an MPU, or the like executing a program stored in an internal storage device while RAM serves as a workspace. The control unit 315 may be for example, implemented with an integrated circuit, such as an ASIC or an FPGA. The control unit 315 includes a communication control unit 316 and a display control unit 317, and implements or executes a function or an action of information processing, which is described below. An internal configuration of the control unit 315 is not limited to the configuration illustrated in FIG. 1, and may be another configuration as long as the configuration allows the information processing described below. Further, the control unit 315 determines whether or not the information processing device 300 performs a support operation for the image transmission control device 100.

The communication control unit 316 outputs control information to the communication unit 311 so as to instruct the communication unit 311 to be communicated with the image transmission control device 100 via the server 200. That is, the communication control unit 316 establishes the coupling with the image transmission control device 100 via the server 200. When the information processing device 300 performs a support operation, the communication control unit 316 transmits an instruction to the server 200, which is for boosting the frequency of the transmission of an image and setting a first transmission frequency Tf1. Further, the communication control unit 316 determines whether or not a notification indicating that the frequency of the transmission of an image from the image transmission control device 100 to the server 200 is set to the first transmission frequency Tf1 is received. When the notification indicating that the transmission frequency is set to the first transmission frequency Tf1 is received, the communication control unit 316 instructs the display control unit 317 to highlight the display screen transmitted from the image transmission control device 100 that has transmitted the notification. For example, the first transmission frequency Tf1 may serve as an upper limit of the transmission frequency. When the notification indicating that the transmission frequency is set to the first transmission frequency Tf1 is not received, the communication control unit 316 provides no instruction for such highlighting to the display control unit 317.

The display control unit 317 causes the display unit 313 to display the display screen received from the image transmission control device 100 via the network N1, the server 200, the network N2, and the communication unit 311. The display control unit 317 updates the display of the display unit 313 according to the transmission frequency of the display screen transmitted from the image transmission control device 100. Further, the display control unit 317 highlights the display screen received from the image transmission control device 100 with a high transmission frequency.

Figure 5:
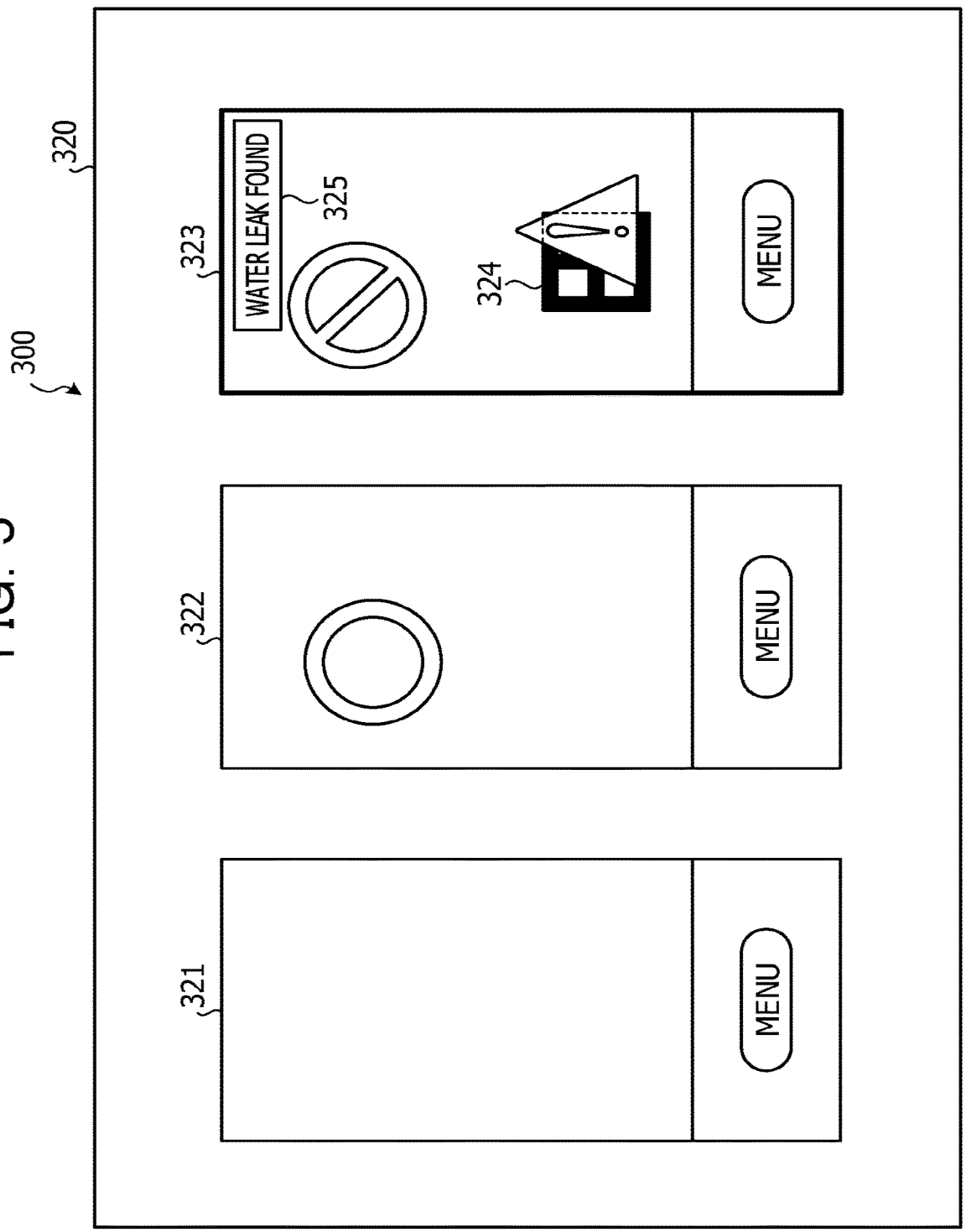
FIG. 5 illustrates an example of highlighting.

An example of the highlighting of a display screen displayed on the display unit 313 is described below. FIG. 5 illustrates an example of the highlighting. Described here is a case as an example, where three image transmission control devices, 100, are communicated with the information processing device 300 and one of the image transmission control devices 100 has a transmission frequency higher than those of the other two image transmission control devices 100. As illustrated in FIG. 5, a display screen 320 includes an image 321 of the display screen acquired from the first image transmission control device 100, an image 322 of the display screen acquired from the second image transmission control device 100, and an image 323 of the display screen acquired from the third image transmission control device 100.

When the image transmission frequency of the third image transmission control device 100 is higher than the image transmission frequencies of the other two image transmission control devices 100, the display control unit 317 thickens and highlights the outer frame of the image 323. The image transmission control device 100 with a high image transmission frequency may be regarded as being higher in importance of remote support than the image transmission control device 100 with the image transmission frequency that is inhibited to be low. Thus, on the display screen 320 of the information processing device 300, the image transmission control device 100 desired to be watched and supported by a user of the information processing device 300 may be clarified by highlighting the image 323 of high importance of remote support. The image 323 is an example of a case where a taken image of an AR marker 324, which is an example of an identifier, and an AR content corresponding to the AR marker 324 (see FIG. 2) are displayed through superimposition. In the image 323, text information 325 is further displayed through superimposition, which promotes the capture of attention of a supported person and/or a supporter.

Figure 6:
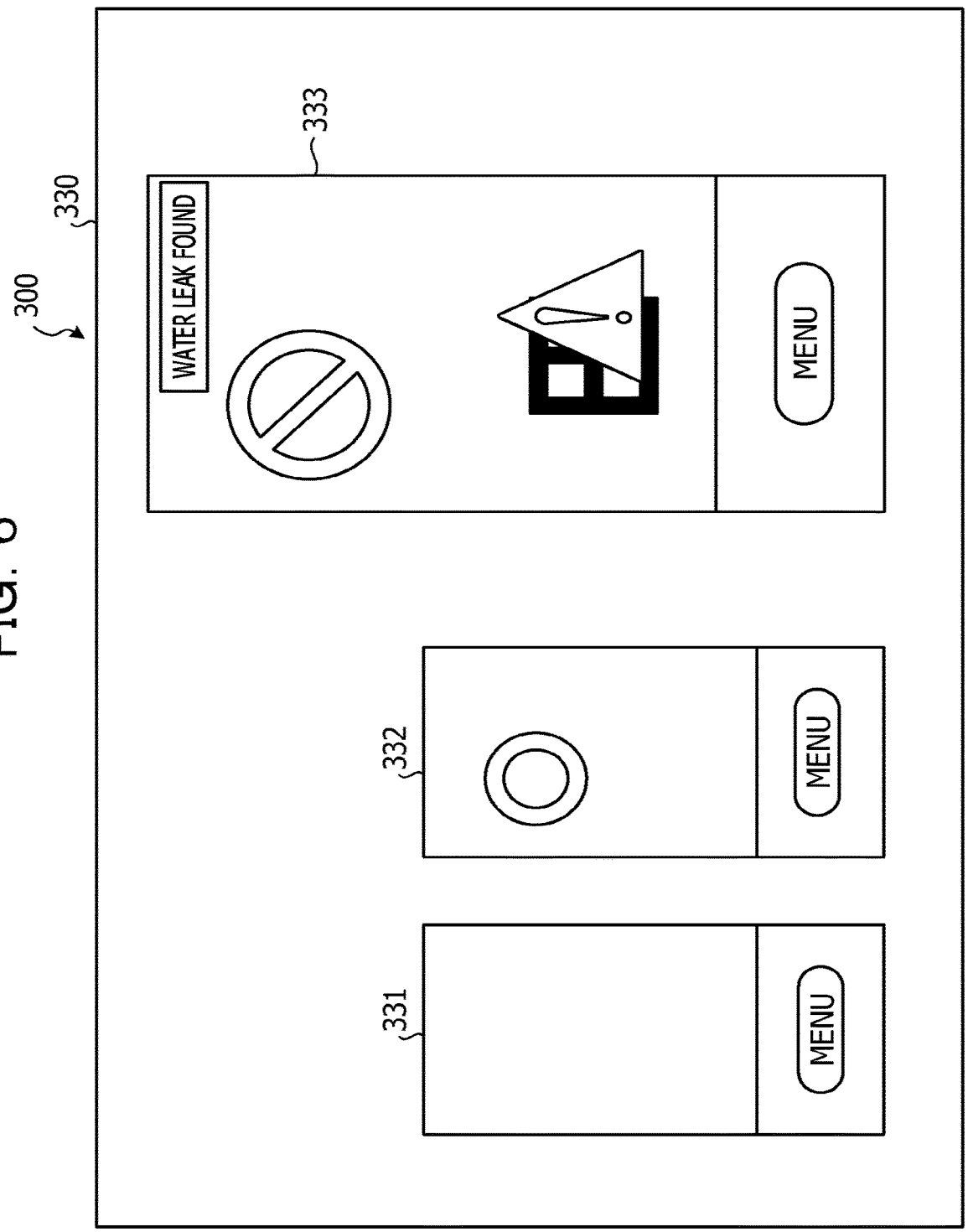
FIG. 6 illustrates another example of the highlighting.

Another example of the highlighting of the display screen displayed on the display unit 313 is described below. FIG. 6 illustrates another example of the highlighting. As an example, a case similar to the case illustrated in FIG. 5, where three image transmission control devices, 100, are communicated with the information processing device 300 and one of the image transmission control devices 100 has a transmission frequency higher than those of the other two image transmission control devices 100 is described. As illustrated in FIG. 6, the display screen 330 includes an image 331 of the display screen acquired from the first image transmission control device 100, an image 332 of the display screen acquired from the second image transmission control device 100, and an image 333 of the display screen acquired from the third image transmission control device 100.

When the image transmission frequency of the third image transmission control device 100 is higher than the image transmission frequencies of the other two image transmission control devices 100, the display control unit 317 highlights the image 333 by making the size of the image 333 larger than those of the other images 331 and 332. Thus, on the display screen 330 of the information processing device 300, the image transmission control device 100 desired to be watched and supported by a user of the information processing device 300 may be clarified by highlighting the image 333 of high importance of remote support.

Figure 7:
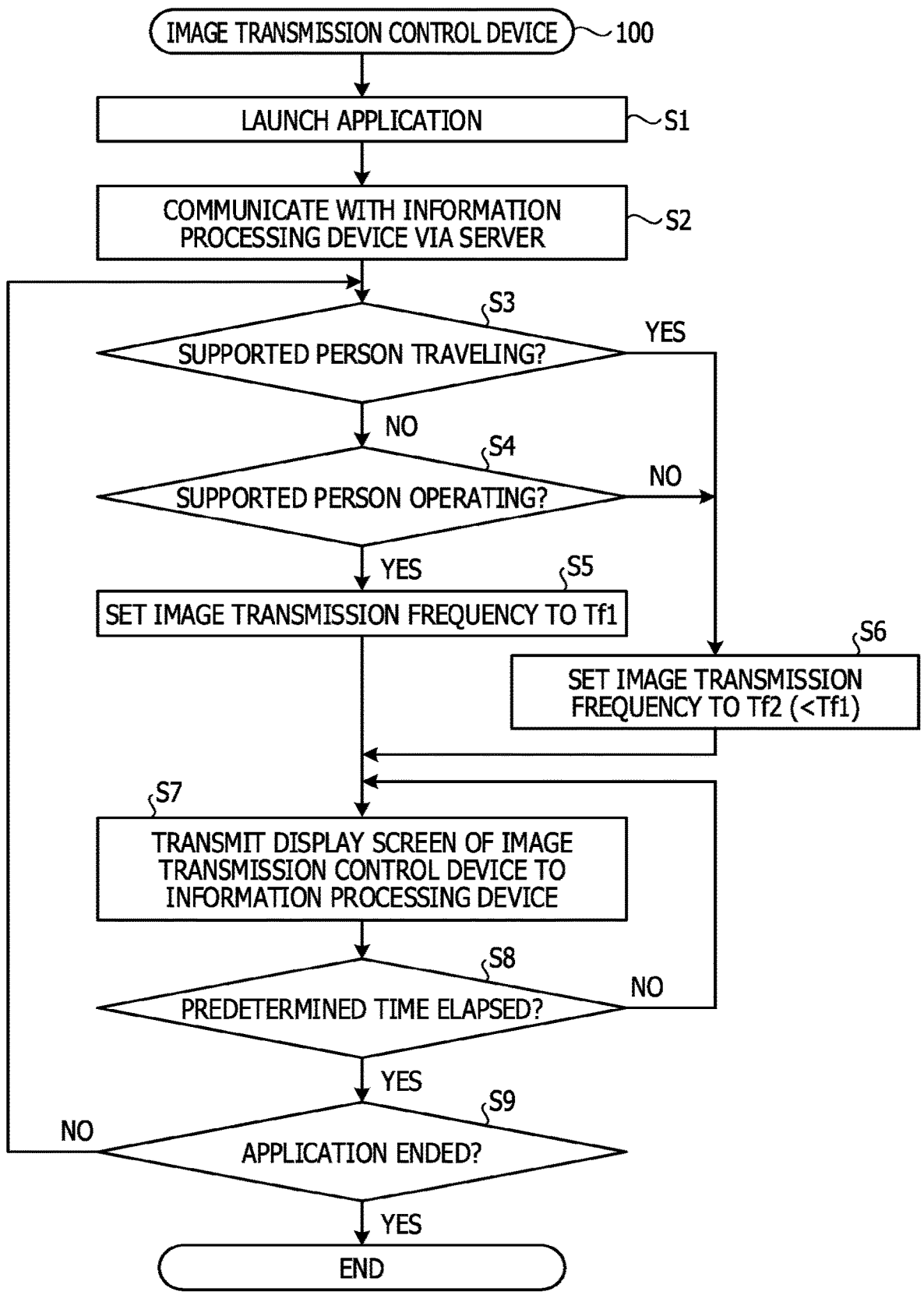
FIG. 7 is a flow chart that illustrates an example of an image transmission control process according to an embodiment.
Figure 8:
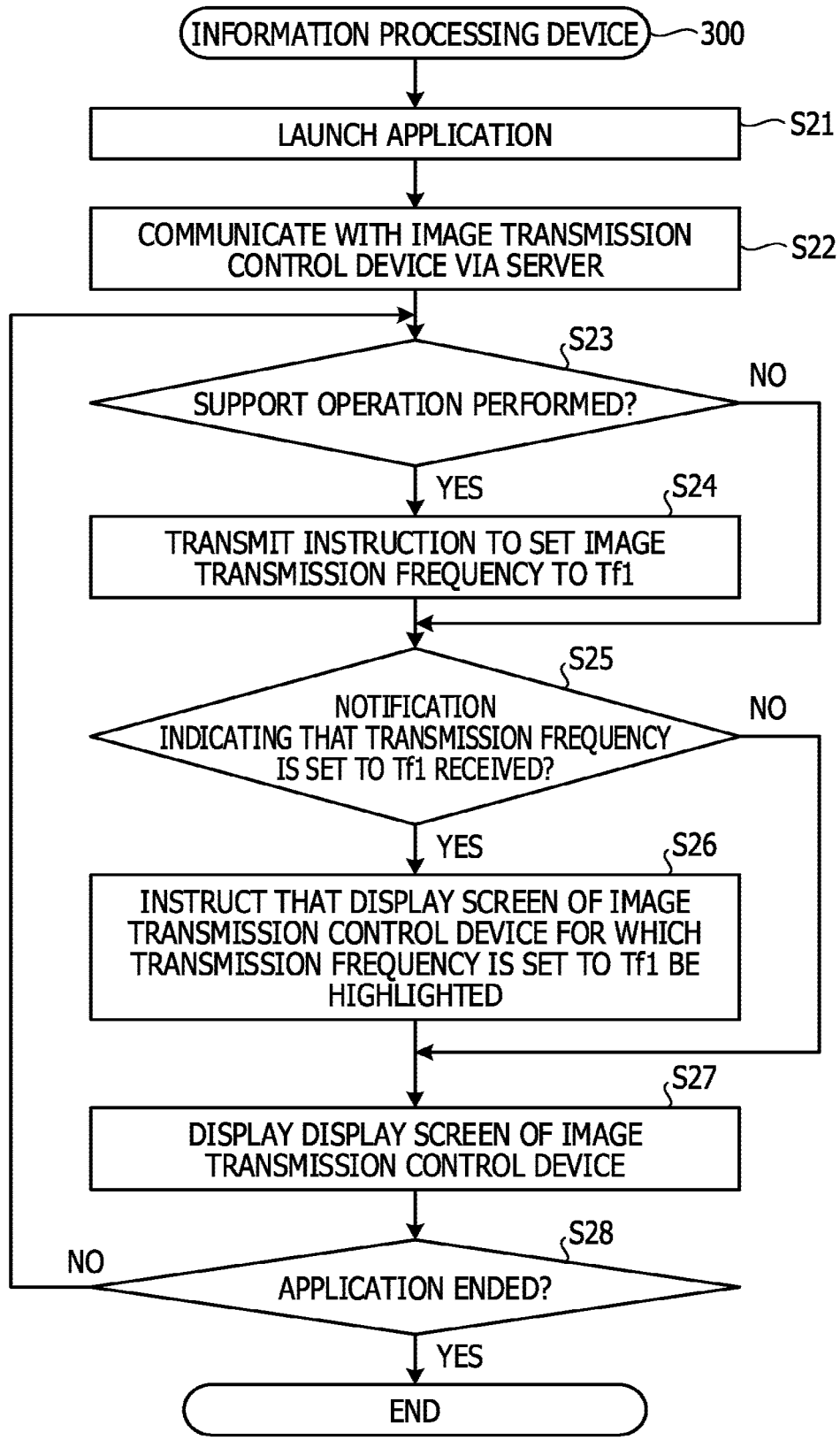
FIG. 8 is a flow chart that illustrates an example of an image transmission control process according to an embodiment.

Operations of the image transmission control system 1 according to an embodiment are described below. FIGS. 7 and 8 are flow charts that each illustrate an example of an image transmission control process according to an embodiment. First, an example of operations on the side of a supported person carrying the HMD 10 and the image transmission control device 100 is described by referring to FIG. 7.

The display control unit 133 of the image transmission control device 100 launches an application (step S1). When the application is launched, the display control unit 133 starts transmitting a display screen of the application to the HMD 10. The communication control unit 132 establishes coupling with the information processing device 300 via the server 200 (step S2).

The comparison unit 131 determines whether or not a supported person who wears the HMD 10 is traveling according to sensor information received from the HMD 10 (step S3). When the supported person is not traveling (NO in step S3), the comparison unit 131 determines whether or not the supported person carrying the image transmission control device 100 is operating (step S4). When the supported person carrying the image transmission control device 100 is operating (YES in step S4), the communication control unit 132 sets the image transmission frequency to the first transmission frequency Tf1 (step S5).

When the supported person is traveling (YES in step S3) or when the supported person is not operating (NO in step S4), the communication control unit 132 inhibits the image transmission frequency and sets the transmission frequency to a second transmission frequency Tf2, which is lower than the first transmission frequency Tf1 (step S6).

The communication control unit 132 transmits a display screen of the image transmission control device 100 to the information processing device 300 via the server 200 with the set transmission frequency Tf1 or Tf2 (step S7).

After the transmission of the display screen in step S7, the communication control unit 132 determines whether or not predetermined time has elapsed (step S8). When the predetermined time has not elapsed (NO in step S8), the process returns to step S7 and the transmission of the display screen is repeated until the predetermined time elapses. When the predetermined time has elapsed (YES in step S8), the display control unit 133 determines whether or not the application is ended (step S9). When the application is not ended (NO in step S9), the process returns to step S3. When the application is ended (YES in step S9), the image transmission control process by the image transmission control device 100 ends. Accordingly, the image transmission control device 100 may inhibit the power consumption caused in the image transmission.

An example of operations of the information processing device 300 on the side of supporting the HMD 10 and the image transmission control device 100 is described below by referring to FIG. 8. In FIG. 8, a default value of the image transmission frequency is set to the second transmission frequency Tf2.

The display control unit 317 of the information processing device 300 launches an application (step S21). The communication control unit 316 establishes coupling with the image transmission control device 100 via the server 200 (step S22).

The control unit 315 determines whether or not a support operation has been performed for the image transmission control device 100 (step S23). When the support operation has been performed (YES in step S23), the communication control unit 316 transmits an instruction for boosting the image transmission frequency and setting the transmission frequency to the first transmission frequency Tf1 to the server 200 (step S24). When no support operation is performed (NO in step S23), the image transmission frequency remains as the second transmission frequency Tf2 and the process proceeds to step S25.

The communication control unit 316 determines whether or not a notification indicating that the frequency of the transmission of an image from the image transmission control device 100 to the server 200 is set to the first transmission frequency Tf1 is received (step S25). When the notification indicating that the transmission frequency is set to the first transmission frequency Tf1 is not received (NO in step S25), the communication control unit 316 goes to step S27. When the notification indicating that the transmission frequency is set to the first transmission frequency Tf1 is received (YES in step S25), the communication control unit 316 instructs the display control unit 317 to highlight a display screen transmitted from the image transmission control device 100 that has transmitted the notification (step S26).

The display control unit 317 causes the display unit 313 to display each display screen of one or more image transmission control devices, 100, which is received from the image transmission control device 100 via the server 200 (step S27). At this time, the display control unit 317 highlights a display screen for which an instruction on highlighting is provided and that corresponds to the image transmission control device 100.

The display control unit 317 determines whether or not the application is ended (step S28). When the application is not ended (NO in step S28), the process returns to step S23.

When the application is ended (YES in step S28), the image transmission control process by the image transmission control device 100 ends. Accordingly, the image transmission control device 100 may inhibit the power consumption.

Thus, the image transmission control device 100 acquires an image taken by the camera 14 and sequentially transmits the acquired images to the information processing device 300. That is, the image transmission control device 100 acquires information on movement of the image transmission control device 100, which is sensed by the sensor 12. The image transmission control device 100 determines whether or not the image transmission control device 100 is traveling according to the acquired information on movement. When it is determined that the image transmission control device 100 is traveling, the image transmission control device 100 inhibits the transmission of an image to the information processing device 300. As a result, power consumption may be inhibited.

The image transmission control device 100 acquires an image taken by the camera 14 and sequentially transmits the acquired images to the information processing device 300. That is, the image transmission control device 100 acquires information on movement of the image transmission control device 100, which is sensed by the sensor 12. The image transmission control device 100 determines whether or not the image transmission control device 100 is traveling according to the acquired information on movement. When it is determined that the image transmission control device 100 is not traveling, the image transmission control device 100 promotes the transmission of an image to the information processing device 300. As a result, power consumption may be inhibited when it is undesired to promote the transmission of an image.

Further, when it is determined that the image transmission control device 100 is not traveling, the image transmission control device 100 transmits an image at the first transmission frequency Tf1, which is preset. When it is determined that the image transmission control device 100 is traveling, the image transmission control device 100 transmits an image at the second transmission frequency Tf2 lower than the first transmission frequency Tf1. As a result, power consumption may be inhibited.

The image transmission control device 100 acquires an image taken by the camera 14 and sequentially transmits the acquired images to the information processing device 300. That is, the image transmission control device 100 acquires information on an operation accepted by the image transmission control device 100. The image transmission control device 100 determines whether or not the image transmission control device 100 is working according to the acquired information on the operation. When it is determined that the image transmission control device 100 is not working, the image transmission control device 100 inhibits the transmission of an image to the information processing device 300. As a result, power consumption may be inhibited.

The image transmission control device 100 acquires an image taken by the camera 14 and sequentially transmits the acquired images to the information processing device 300. That is, the image transmission control device 100 acquires information on an operation accepted by the image transmission control device 100. The image transmission control device 100 determines whether or not the image transmission control device 100 is working according to the acquired information on the operation. When it is determined that the image transmission control device 100 is working, the image transmission control device 100 promotes the transmission of an image to the information processing device 300. As a result, power consumption may be inhibited when it is undesired to promote the transmission of an image.

Further, when it is determined that the image transmission control device 100 is working, the image transmission control device 100 transmits an image with the first transmission frequency Tf1, which is preset. When it is determined that the image transmission control device 100 is not working, the image transmission control device 100 transmits an image with the second transmission frequency Tf2 lower than the first transmission frequency Tf1. As a result, power consumption may be inhibited.

Although in the above-described embodiment, information on movement of a user is acquired with the sensor 12 of the HMD 10, the acquisition is not limited thereto. For example, information on movement of a user may be acquired in the image transmission control device 100.

Although in the above-described embodiment, remote support for an inspection operator of equipment inspection in a factory is taken as an example, the present disclosure is not limited thereto. For example, the present disclosure may be applied to guide to popular sights for tourists in a resort, or the like.

Although the above-described embodiment is described as an embodiment where the image transmission control device 100 and the HMD 10 are worn by a user, the present disclosure is not limited thereto. For example, a display screen may be displayed on the display operation unit 113 of the image transmission control device 100, which is a smartphone for example, instead of using the HMD 10.

Each constituent of each unit illustrated is not necessarily desired to be configured physically as illustrated. That is, specific embodiments of distribution and integration of each unit are not limited to what is illustrated, and the whole or part of the illustrated units may be configured by being functionally or physically distributed or integrated in desired units according to various loads or usage circumstances. For example, the display control unit 17 and the camera control unit 18 may be integrated. The illustrated processes are not limited to the above-described order but may be implemented concurrently or in a switched order within the scope where no contradiction is caused.

The whole or desired part of various processing functions performed in each unit may be executed on a CPU or a microcomputer, such as an MPU or a micro controller unit (MCU). It is needless to mention that the whole or desired part of the various processing functions may be executed on a program analyzed and executed on a CPU or a microcomputer, such as an MPU or an MCU or on hardware of wired logic.

Figure 9:
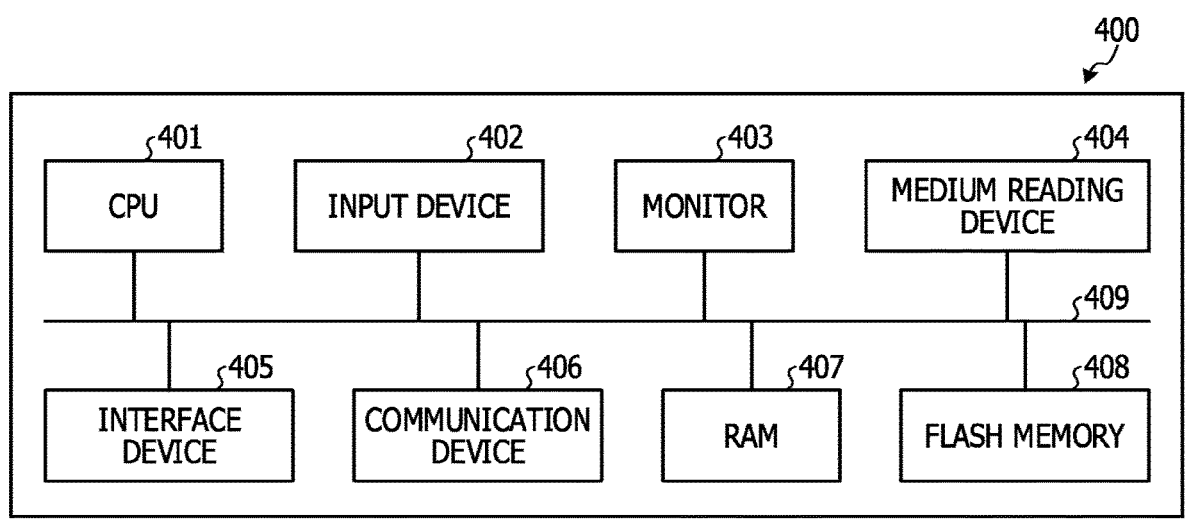
FIG. 9 illustrates an example of a computer that executes an image transmission control program.

The processes described above in each embodiment may be implemented by executing a prepared program with a computer. Thus, an example of a computer that executes a program having functions similar to those in each of the above-described embodiments is described below. FIG. 9 illustrates an example of a computer that executes an image transmission control program.

As illustrated in FIG. 9, a computer 400 includes a CPU 401, which executes various computing processes, an input device 402, which accepts data input, and a monitor 403. The computer 400 further includes a medium reading device 404, which reads a program or the like from a storage medium, an interface device 405 for coupling to various devices, and a communication device 406 for coupling to another information processing device or the like in a wired manner or wirelessly. The computer 400 further includes RAM 407, which stores various kinds of information temporarily, and flash memory 408. Each of the devices 401 to 408 are coupled to a bus 409.

An image transmission control program with functions similar to those of each processing unit of the comparison unit 131, the communication control unit 132, and the display control unit 133 illustrated in FIG. 1 is stored in the flash memory 408. Further, various data for implementing the image transmission control program are stored in the flash memory 408. For example, the input device 402 accepts input of various kinds of information from a user of the computer 400, such as operation information. For example, the monitor 403 displays various screens to the user of the computer 400, such as a display screen. For example, headphones or the like are coupled to the interface device 405. For example, the communication device 406 has functions similar to those of the first communication unit 110 and the second communication unit 111 illustrated in FIG. 1 and is coupled to the HMD 10 and the network N1 to exchange various kinds of information with the HMD 10 and the server 200.

The CPU 401 performs various processes by reading each program stored in the flash memory 408 and expanding the program in the RAM 407 to execute the program. Such programs enable the computer 400 to function as the comparison unit 131, the communication control unit 132, and the display control unit 133 illustrated in FIG. 1.

The above-described image transmission control program is not necessarily desired to be stored in the flash memory 408. For example, the computer 400 may read and execute a program stored in a storage medium readable by the computer 400. The storage medium readable by the computer 400 corresponds to for example, a portable recording medium, such as a compact disc read-only memory (CD-ROM), a digital versatile disc (DVD), or universal serial bus (USB) memory, or semiconductor memory, such as flash memory, a hard disk drive, or the like. The image transmission control program may be stored in a device communicated with a public network, the Internet, LAN, or the like and the computer 400 may read the image transmission control program therefrom and execute the image transmission control program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method executed by a processor, the method comprising:
   acquiring sensor information on movement of a first computer that includes a sensor, the sensor information being sensed by the sensor;
   first determining whether or not the first computer is traveling according to the sensor information;
   second determining whether or not the first computer is operated by a first user;
   deciding a frequency with which a plurality of images taken by a camera that travels with the first computer are transmitted to a second computer according to results of the first determining and the second determining; and sequentially transmitting the plurality of images to the second computer according to the frequency.

2. The method according to claim 1, wherein
the second computer is operated by a second user different from the first user, and
the method further comprising causing a display to sequentially display the plurality of images acquired with the frequency, and outputs support information for the second user remotely supporting the user to the first computer.

3. The method according to claim 1, wherein the first computer is a head mount display device that includes the camera in addition to the sensor.

4. The method according to claim 1, further comprising:
when a result of the second determining indicates that the first computer is operated, transmitting the plurality of images to the second computer with a first frequency from among the first frequency and a second frequency, wherein
the first frequency is larger than the second frequency.

5. The method according to claim 4, further comprising:
when a first result of the first determining indicates that the first computer is not traveling and when the result of the second determining indicates that the user is operating, transmitting the plurality of images to the second computer with the first frequency.

6. The method according to claim 1, further comprising:
when a result of the second determining indicates that the first computer is not operated, transmitting the plurality of images to the second computer with the second frequency from among the first frequency and the second frequency, wherein
the second frequency is smaller than the first frequency.

7. The method according to claim 6, further comprising:
when a first result of the first determining indicates that the first computer is not traveling and when the result of the second determining indicates that the user is not operating, transmitting the plurality of images to the second computer with the second frequency.

8. The method according to claim 1, wherein the second determining includes determining that the user is operating when an identifier is detected from an image included in the plurality of images.

9. The method according to claim 1, further comprising:
third determining whether or not an identifier is detected from each of the plurality of images;
when the identifier is detected, acquiring a content corresponding to the identifier; and
generating image information that includes the content.

10. The method according to claim 9, wherein
the first computer is a head mount display device that includes the camera and a transmissive display in addition to the sensor, and
the image information includes the content only and is displayed on the transmissive display.

11. The method according to claim 10, further comprising:
when the identifier is detected, generating another image information where the content is superimposed over an image from which the identifier is detected; and displaying a screen according to the another image information on another display.

12. The method according to claim 11, further comprising:
transmitting the another image information to the second computer,
wherein the second computer causes a display to display the another image information.

13. A non-transitory computer-readable storage medium storing a program that cases a computer to execute a process, the process comprising:
acquiring sensor information on movement of a first computer that includes a sensor, the sensor information being sensed by the sensor;
first determining whether or not the first computer is traveling according to the sensor information;
second determining whether or not the first computer is operated by a first user;
deciding a frequency with which a plurality of images taken by a camera that travels with the first computer are transmitted to a second computer according to results of the first determining and the second determining; and
sequentially transmitting the plurality of images to the second computer according to the frequency.

14. A system, comprising:
a first device; and
a second device, wherein
the first device includes circuitry configured to:
acquire sensor information on movement of a second device that includes a sensor, the sensor information being sensed by the sensor;
first determine whether or not the second device is traveling according to the sensor information;
second determine whether or not the second device is operated by a user;
decide a frequency with which a plurality of images taken by a camera that travels with the second device are transmitted to a second computer according to results of the first determine and the second determine; and
transmit the plurality of images to the second computer according to the frequency sequentially, and
the first device is operated by another user different from the user of the second device and causes a display to sequentially display the plurality of images acquired with the frequency.

15. A device, comprising:
circuitry configured to:
acquire sensor information on movement of a first computer that includes a sensor, the sensor information being sensed by the sensor;
first determine whether or not the first computer is traveling according to the sensor information;
second determine whether or not the first computer is operated by a first user;
decide a frequency with which a plurality of images taken by a camera that travels with the first computer are transmitted to a second computer according to results of the first determine and the second determine; and
transmit the plurality of images to the second computer according to the frequency sequentially.

* * * * *